United States Patent
Pop et al.

(10) Patent No.: US 12,244,876 B2
(45) Date of Patent: Mar. 4, 2025

(54) METHOD PROVIDING TO A USER TERMINAL A TARGET MULTIMEDIA CONTENT AVAILABLE AT A MASTER SERVER

(71) Applicant: Orange, Issy-Les-Moulineaux (FR)

(72) Inventors: Gheorghe Pop, Bucarest (RO); Cosmin Marian Matache, Bucarest (RO); Marius-Sorin Munteanu, Bucarest (RO)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/920,714

(22) PCT Filed: Apr. 20, 2021

(86) PCT No.: PCT/EP2021/060187
§ 371 (c)(1),
(2) Date: Oct. 21, 2022

(87) PCT Pub. No.: WO2021/214031
PCT Pub. Date: Oct. 28, 2021

(65) Prior Publication Data
US 2023/0171441 A1    Jun. 1, 2023

(30) Foreign Application Priority Data
Apr. 22, 2020    (EP) .................................. 20305389

(51) Int. Cl.
*H04N 21/2225*    (2011.01)
*H04N 21/231*    (2011.01)
(Continued)

(52) U.S. Cl.
CPC ... *H04N 21/2225* (2013.01); *H04N 21/23113* (2013.01); *H04N 21/242* (2013.01); *H04N 21/41407* (2013.01); *H04N 21/437* (2013.01)

(58) Field of Classification Search
CPC ......... H04N 21/2225; H04N 21/23113; H04N 21/242; H04N 21/41407; H04N 21/437;
(Continued)

(56) References Cited

U.S. PATENT DOCUMENTS

2007/0265935 A1* 11/2007 Woycik ..................... G07F 5/18
705/26.5
2008/0082555 A1* 4/2008 Salmon ............... H04L 67/1097
(Continued)

FOREIGN PATENT DOCUMENTS

EP    2 945 389 A1    11/2015
JP    3674351 B2 *    7/2005    ............... G06F 8/65

OTHER PUBLICATIONS

International Search Report for International Application No. PCT/EP2021/060187 dated May 21, 2021.

*Primary Examiner* — Cynthia M Fogg
(74) *Attorney, Agent, or Firm* — Knobbe, Martens, Olson & Bear, LLP

(57) ABSTRACT

A method for providing to a user terminal a target multimedia content belonging to a first set of multimedia contents available at a master server is disclosed. The method includes, performed by a processing unit of a slave server connected to both the user terminal and the master server through a network, synchronizing (a) the slave server with the master server so that each multimedia content of the first set of multimedia contents available at a master server is also available at the slave server; and providing (b) the target multimedia content to the user terminal from the slave server.

11 Claims, 2 Drawing Sheets

(51) Int. Cl.
*H04N 21/242* (2011.01)
*H04N 21/414* (2011.01)
*H04N 21/437* (2011.01)

(58) Field of Classification Search
CPC ....... H04N 21/23116; H04N 21/23439; H04N 21/25825; H04N 7/17318; H04N 21/234363; H04N 21/2358; H04N 21/4358; H04N 21/237
USPC .......................................................... 725/93
See application file for complete search history.

(56) References Cited

U.S. PATENT DOCUMENTS

| | | | |
|---|---|---|---|
| 2013/0036135 | A1 | 2/2013 | Brockey et al. |
| 2013/0038509 | A1* | 2/2013 | Jiang ........................ G09G 5/12 345/1.3 |
| 2013/0222695 | A1* | 8/2013 | Qin .......................... H04N 5/45 348/565 |
| 2014/0282770 | A1 | 9/2014 | McKinley et al. |
| 2016/0373502 | A1* | 12/2016 | Smith ...................... H04L 65/80 |
| 2018/0014082 | A1* | 1/2018 | Daily ....................... H04L 69/16 |
| 2018/0150477 | A1* | 5/2018 | Jewell .................... G06F 16/172 |
| 2018/0367591 | A1* | 12/2018 | Alm .................... H04N 21/8547 |
| 2019/0068679 | A1* | 2/2019 | Subramaniam Natarajan ............. H04L 65/612 |
| 2020/0267429 | A1* | 8/2020 | He ..................... H04N 21/8456 |
| 2021/0044639 | A1* | 2/2021 | Tielemans ........... H04N 19/132 |
| 2021/0152865 | A1* | 5/2021 | Kumar ............... H04N 21/2181 |

* cited by examiner

METHOD PROVIDING TO A USER TERMINAL A TARGET MULTIMEDIA CONTENT AVAILABLE AT A MASTER SERVER

CROSS-REFERENCE TO RELATED APPLICATIONS

This application is filed under 35 U.S.C. § 371 as the U.S. National Phase of Application No. PCT/EP2021/060187 entitled "METHOD PROVIDING TO A USER TERMINAL A TARGET MULTIMEDIA CONTENT AVAILABLE AT A MASTER SERVER" and filed Apr. 20, 2021, and which claims priority to EP 20305389.7 filed Apr. 22, 2020, each of which is incorporated by reference in its entirety.

BACKGROUND

Field

The field of this development is that of multimedia content delivery.

More particularly, the development relates to a method for providing to a user terminal a target multimedia content available at a master server.

Description of the Related Technology

Video On Demand, also referred to as VOD, is a technique for accessing video contents without the constraints of a typical static broadcasting schedule. The video contents are streamed through networks up to a user's client device (for instance a mobile device such as a smartphone).

In the current VOD architecture, as used for instance by traditional content delivery network (CDN) providers, a VOD server (typically in a cloud) interacts with caching servers located closer to the user (for instance in the same country as the user, whereas the VOD server is in another country). For instance, when a VOD server is deployed in North America for American clients, a caching server needs to be deployed in Asia for delivering the same contents to the Asian clients.

In such a traditional VOD architecture, when a user wants to access a VOD content through its client terminal, this user has to send a request to the VOD server, which will trigger the access to the selected content downloaded from the caching server to the mobile terminal.

However, such a mobile VOD architecture is complex, expensive to resist to the high user numbers and generates a lot of data traffic. Indeed, each caching server downloads high quality video contents almost continuously from the VOD server.

These downloads generate potentially huge data traffic on the networks interconnecting the VOD server and the caching servers (e.g., on internet) which is expensive and prone to download interruptions for the user, due to instabilities affecting the network connections between the VOD server and the caching servers at the time of downloading the content requested by the user.

In addition, since there is only one portal interface to access the VOD server in this traditional VOD architecture, this portal interface cannot be customized country by country.

A specific example of a VOD architecture based on caching servers is illustrated in US 2014/0282770. In this example, most popular contents of a content server are cached in accessible temporary storage locations of a VOD system, in order to avoid VOD servers obtaining repeatedly such most popular media contents from their original content providers. In this application, a hierarchical caching method is also relied upon, wherein temporary storage locations that make up a cache are organized into hierarchy having multiple layers, in order to balance storage and retrieval efficiency against bandwidth performance.

However, since this specific VOD architecture still relies on a caching mechanism, and in particular induces on-the-spot data traffic between a remote content server and a more local VOD server whenever a requested content is not already stored in the cache of the VOD server, it still presents the aforementioned drawbacks in terms of potential download interruptions, complexity and expensiveness to resist to high user numbers generating a lot of data traffic.

There is consequently a need for a new method for providing multimedia contents to user terminal, which is simpler, cheaper, uses less bandwidth, so as to be in particular used in countries with low cost infrastructure.

SUMMARY

For these purposes, the present development provides a method for providing to a user terminal a target multimedia content belonging to a first set of multimedia contents available at a master server, the method being characterized in that it comprises the following steps, performed by a processing unit of a slave server connected to both the user terminal and the master server through a network:
synchronizing the slave server with the master server so that each multimedia content of said first set of multimedia contents available at a master server is also available at the slave server; and
providing said target multimedia content to the user terminal from the slave server.

By relying on the synchronization of contents between a master server and a slave server rather than merely implementing a caching process in the slave server, such a method avoids data traffic between the master server and the slave server whenever a user requests multimedia content which is not already stored by the slave server, which may cause an uncontrolled and potentially huge impact on the bandwidth usage of the networks interconnecting the master and slave servers, especially when the master server is located far away from the slave server, when there is a high number of simultaneous multimedia content requests and/or when the requested multimedia content is a high quality multimedia content requiring substantial bandwidth to be downloaded.

Preferred but non limiting features of the present development are as follow:
providing said target multimedia content to the user terminal from the slave server is performed when receiving a request for said target multimedia content from the user terminal;
the user terminal is implementing a dedicated client application for redirecting the user to the slave server and generating said request.
synchronizing the slave server with the master server is periodically performed, in particular at least once every hour;
the master server stores a first indexation file describing the first set of multimedia contents available at the master server; and the slave server stores a second indexation file describing a second set of multimedia contents available at the slave server;

synchronizing the slave server with the master server comprises downloading the first indexation file from the master server and updating the second indexation file.

synchronizing the slave server with the master server comprises:
checking if at least one new multimedia content has been added to the first set of multimedia contents available at the master server, and
downloading from the master server each new multimedia content added to said first set of multimedia contents available at the master server, in order to add said new multimedia content to a second set of multimedia contents available at the slave server;

synchronizing the slave server with the master server comprises:
checking if at least one multimedia content has been deleted from the first set of multimedia contents available at the master server, and
deleting each multimedia content deleted from said set of multimedia contents available at the master server from the second set of multimedia contents available at the slave server;

the multimedia contents are available at the master server under at least a higher quality version and a lower quality version, and the multimedia contents are available at the slave server only under said lower quality version;

the master server is configured to generate, for each higher quality version of a multimedia content available at the master server, the corresponding lower quality version;

the user terminal is a mobile terminal, the dedicated client application automatically requesting the low-quality version of said target multimedia content.

In a second aspect, the development provides a slave server connected to both a user terminal and a master server through a network, a first set of multimedia contents, including a target multimedia content, being available at a master server, characterized in that it comprises a processing unit (configured to implement,
synchronizing the slave server with the master server so that each multimedia content of said first set of multimedia contents available at a master server is also available at the slave server; and
providing said target multimedia content to the user terminal from the slave server.

According to a third and a fourth aspects, the development provides a computer program product, comprising code instructions for executing a method according to the first aspect for providing to a user terminal a target multimedia content belonging to a first set of multimedia contents available at a master server; and a computer-readable medium, on which is stored a computer program product comprising code instructions for executing a method according to the first aspect for providing to a user terminal a target multimedia content belonging to a first set of multimedia contents available at a master server.

BRIEF DESCRIPTION OF THE DRAWINGS

The above and other objects, features and advantages of this development will be apparent in the following detailed description of an illustrative embodiment thereof, which is to be read in connection with the accompanying drawings wherein.

DETAILED DESCRIPTION OF CERTAIN ILLUSTRATIVE EMBODIMENTS

Architecture

The present development relates to a method for providing multimedia contents to a user terminal 1 through a network 10. In the following description, a given multimedia content that the user wants to retrieve will be referred to as "target multimedia content". The multimedia contents could of be any type such as an image, an audio content or a video.

The present development is particularly applicable in the context of VOD, wherein the multimedia contents are videos which are "streamed", i.e. directly played by the user terminal 1 while being received, by contrast to "direct downloading" where video files are entirely received by a user terminal before being played. However, the present method is not limited to the sole cases of VOD or streaming.

Figure 1:
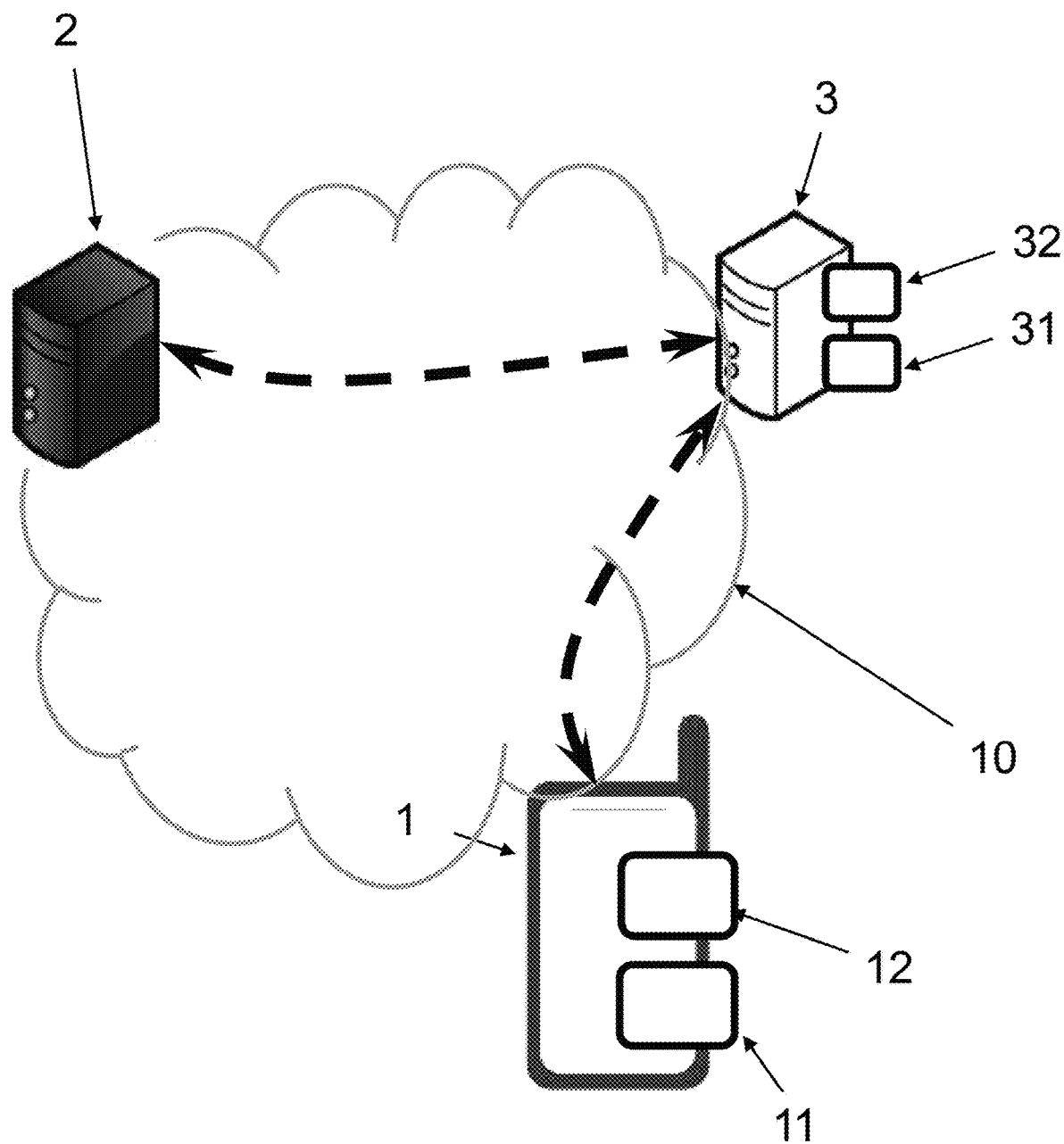
FIG. 1 illustrates an example of network architecture in which the method according to the development is performed.

As represented by FIG. 1, the network 10 is typically a Wide Area Network such as Internet.

The network 10 connects at least the user terminal 1, a master server 2 and a slave server 3. As it will be explained, there may be a plurality of slave servers 3 in particular associated to different geographical areas (for example one slave server 3 per country, the slave server 3 being advantageously physically located in the country it serves).

The user terminal 1 could be any electronic device for receiving and advantageously playing the target multimedia content such as a computer, a smart TV, a smartphone, a set-top box, etc. The user terminal 1 comprises a processing unit 11 (e.g. a processor) and a storage unit 12 (e.g. a memory, for example flash memory or a hard drive) for being delivered the target multimedia content.

In a preferred embodiment, the user terminal 1 is a "mobile" terminal, such as a smartphone or a touch tablet, i.e. a terminal with a small screen and comparatively lower resources with respect to other terminals such as a television or a computer, and thus generally consuming a version of the multimedia content adapted to the specifications of the mobile terminal, i.e. a "lower quality" (or "size-optimized") multimedia content. In the following description, the wording "lower quality" should be understood relatively with respect to "higher quality", and may be expressed in many ways (for a video, the quality may be a function of a resolution, bitrate, number of frames per second etc.). As an example, we will take as a lower quality multimedia content a SD video (resolution up to 720p) and as a higher quality multimedia content a HD video (resolution at least equal to 1080p). Note that the notion of lower/higher quality can be also expressed for other types of multimedia contents such as audio content. A lower quality version of a content always presents a sensibly smaller size ("size-optimized") that a higher quality version.

Note that these lower quality versions of the multimedia contents can be provided by the content providers themselves, when they provide new contents in higher quality to the master server 2, or can be generated by the master server 2 itself from the higher quality version when received (i.e. the master server 2 converts the higher quality version into a lower quality version and stores the two versions for future use).

The user terminal 1 may implement a dedicated client application for accessing the multimedia contents, in particular configurated for communicating with the slave server 3 (see below) and directly requests multimedia content under a adapted quality considering the terminal type (for instance a lower quality version for a mobile terminal).

The master server 2 is any typical content server, in particular a server of a CDN (for "Content Delivery Network"). Note that there may be a plurality of master servers 2 constituting a cloud, in any known fashion.

The master server 2 stores a set of "available" multimedia contents, referred to as first set. In other words, any multimedia content available at the master server 2 may be requested by the user terminal 1. The terms "content available at a server" means here that the content is stored in this server and can be requested from this server by a user terminal.

The target multimedia content is considered to belong to said first set, i.e. it is available at the master server 2. Multimedia content of the video type may be stored for instance as ".ts" packages. Note that, a given content available at the master server 2 could be available under a plurality of versions, in particular according to different qualities (at least a lower quality version and a higher quality version, as explained). In other words, several copies of the same multimedia content (having various sizes) may be simultaneously stored at the master server 2.

Note that the first set may be regularly updated, for instance by adding new contents or deleting old contents.

Advantageously, the master server 2 also stores a first indexation file describing the first set of multimedia contents available at the master server 2. Such first indexation file is typically a list of the multimedia contents of the first set, for example a ".m3u8" list. In case of un update of the first set, the first indexation file is automatically updated accordingly.

In an exemplary embodiment, the master server 2 is implemented using a combination of three open source containers which are working together to create the master server in VMware in Cloud, using the simplest and low resources demanding solution. The orchestration of containers can be made by docker swarm which is native in docker. Indeed, as it will be explained the present master server 2 does not need a high availability (contrary to the prior art VOD servers). In addition, in order to create a special portal for uploading the multimedia contents and make their management into a database, a fourth container can be used for collaborating with a host by using bash scripts.

The slave server 3 can be any simple server also comprising a processing unit 31 (e.g. a processor) and a storage unit 32 (e.g. a memory, for example flash memory or a hard drive), on which a web application for providing multimedia contents to the user terminal 1 is installed, for example a linux server with apache.

Slave Server—Synchronization

The present method originally uses the slave server 3 as a low cost replicate of the master server 2, thanks to an original synchronization process.

It is noted here that this synchronization process is totally different from the caching process used in traditional caching VOD architectures.

In particular, the traditional process of caching a content in a local server implies storing temporarily this content in an accessible temporary storage location of this local server after that this local server has received a first request from a user to obtain this content. This caching operation allows the local server to directly provide the same cached content to other users (or even to the same user) if there are more requests received for this content during the temporary storage of this content, i.e. during a certain duration of time.

On the contrary, the synchronization of contents between a master server and a slave server implies that, once a content is stored in the slave server (e.g. after that the same content had been added in the master server, possibly in a different version, in a set of contents to be synchronized between both servers), this content remains stored in the slave server as long as it is also stored in the master server, and the storage of this content in the slave server only ends when the same content is removed from the master server.

Thus, in the present method, when the user wants to access a multimedia content from its terminal 1, this multimedia content is downloaded from the slave server 3 where it is made available through synchronization with the master server 2, and not from the master server 2 as would be the case in a caching architecture whenever the requested content is not already cached in the local server.

This enables controlling, and potentially reducing, the data traffic on the networks interconnecting the servers storing the contents and the local (slave) servers serving the users, by contrast with a traditional cache architecture which potentially generates traffic continuously between the remote content server and the local caching servers in an uncontrolled way for the interconnecting networks operators. Using such a synchronization process also avoids download interruptions for the user, which may occur in the traditional VOD architecture when network connections between the remote content server and the local caching server (e.g. on internet) are unstable. This also enables customizing the application on a slave server per slave server (i.e. country per country) basis.

The present method for providing to the user terminal 1 the target multimedia content belonging to the first set of multimedia contents is performed by the processing unit 31 of the slave server 3.

Figure 2:
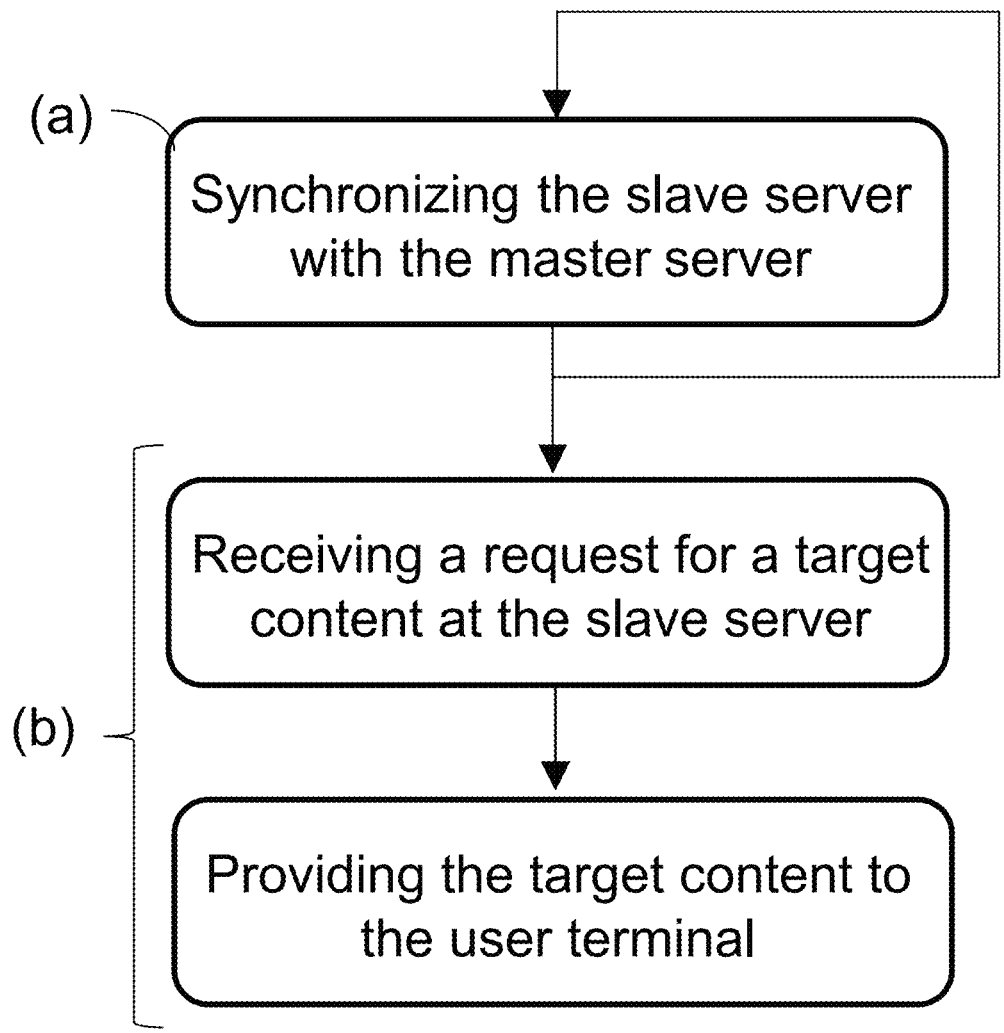
FIG. 2 illustrates an embodiment of the method according to the development.

As represented by FIG. 2, it comprises a main step (a) of synchronizing the slave server 3 with the master server 2, so that each multimedia content of said first set of multimedia contents available at a master server 2 is also available at the slave server 3. This step (a) can be made any time deemed necessary. This step (a) is advantageously periodically performed, in particular at least once every hour, preferably at least once every ten minutes, and for example once every three minutes. It is to be understood that this step (a) is preferably performed at the initiative of the slave server 3, i.e. the multimedia contents are "pulled" from the master server 2, and not "pushed" by the master server 2, so as to be as resource effective as possible.

In more details, the slave server 3 also stores a set of available multimedia contents, referred to as second set, that is intended to be as similar as possible the first set thanks to the synchronization step (a), so that any multimedia content available at the master server 2 could be retrieved by the user terminal 1 directly from the slave server 3. If the synchronization has been performed, the target multimedia content shall belong to said second set as it already belongs to the first set, i.e. be available at the slave server 3.

In other words, step (a) preferably comprises synchronizing (a) the slave server 3 with the master server 2 so that a multimedia content is made available in the second set if, and only if, it is available in the first set.

Note that such synchronization does not imply that the first and second sets are identical, only that their contents are equally available. Indeed, as explained, a given multimedia content could be available at the master server 2 under a plurality of versions, while being available at the slave server 3 only under a subset of said plurality of versions, in particular according to the lowest qualities. In other words, in the case wherein a lower quality version (e.g. a few teens of megabytes in size) and a higher quality version (e.g. several gigabytes in size) are available for the same content at the main server 2, only the lower quality version of this content is preferably available at the slave server 3. It is to be understood that for a content to be considered available, only one version is required, so that even if less versions of this content are available at the slave server 3 than at the master server 2, the multimedia contents are considered equally available. To rephrase again, the first set and the second set could be different.

By downloading only the lower quality versions of the multimedia contents at the slave server 3, the transfer of the multimedia content consumes even less bandwidth than in the prior art architecture. For instance, when the low quality version of the content has a few teens of megabytes in size, this version can be segmented .ts files each having a few kilobytes in size, which are very easy to provide to the slave server 3 during the synchronization step (this may be achieved in a few minutes for an entire movie). Furthermore, for storing for example several hundreds of hours of video in a low resolution for mobile terminals, only a few gigabytes of memory are needed in the slave server 3.

Besides, the CPU consumption of the slave server 3 stays very low because all lower quality multimedia contents are ready to be delivered to user terminals. This way, the slave server 3 does not need to live decode (for instance with ffmpeg) the videos in order to forward them to the mobile terminals, which requires a high processor and memory consumption process. Such a processing is not necessary because the size optimization process was made only once, in the master server 2.

Synchronization step (a) advantageously comprises checking if at least one multimedia content has been added to the first set of multimedia contents available at the master server 2, and downloading from the master server 2 each multimedia content added to said first set of multimedia contents available at the master server 2 to the second set of multimedia contents available at the slave server 3 (possibly under less versions than available at the master server 2). Similarly, synchronization step (a) advantageously comprises checking if at least one multimedia content has been deleted from the first set of multimedia contents available at the master server 2, and deleting each multimedia content deleted from said set of multimedia contents available at the master server 2 from the second set of multimedia contents available at the slave server 3.

In the case where there is a first indexation file, the slave server 3 may similarly store a second indexation file describing the second set of multimedia contents available at the slave server 3. Then, step (a) preferably comprises firstly downloading the first indexation file from the master server 2 and updating the second indexation file: therefore, the slave server 3 directly knows what are the added/deleted contents by comparing with the first and second indexation files.

In an exemplary embodiment, a script of synchronization is installed into the slave server 3. This script checks for modification of multimedia contents stored in the master server. If such modifications exist, the new .ts package and updated .m3u8 list are downloaded from the master server 2 to the slave server 3, and a "channels.json" file (which indicates the available contents) is updated.

Since usually, there are only a few new videos per week, and because the user does not directly connect to master server, the data consumption is very low (and cost can be reduced for the client). In addition, there is no need for a high internet connection stability as in the prior art architecture, since the slave server 3 and master server 2 connect with each other only periodically and if this connection is interrupted, it can be resumed later with little impact on the service.

Note that the periodical check costs near to zero in terms of bandwidth. In case of lower quality videos (e.g. videos adapted for display on a mobile terminal), downloading the new multimedia contents only generates a few megabytes of traffic per week.

Providing the Target Multimedia Content

The method further comprises a step (b) of providing said target multimedia content to the user terminal 1 from the slave server 3.

As explained, this step can be totally independent from synchronizing step (a), that can be performed periodically, independently from any user demand.

By contrast, step (b) is preferably performed when receiving a request for said target multimedia content from the user terminal 1. It is to be understood that the present method is performed by the processing means 31 of the slave server 3, so that said request is directed to the slave server 3 and not to the master server 2.

As already explains, the user terminal 1 preferably implements a dedicated client application for redirecting the user to the slave server 3 and generating said request. In other words, the user selects the target multimedia content on its user terminal 1, in particular for directly playing it, and the user terminal 1 generated the suitable requests, sends it to the slave server 3, and receives in response the content.

This client application preferably comprises a player for directly playing the content while it is received (streaming). Thus, there may be server module on the slave server 3 for communicating with the client application. More precisely, the slave server 3 may provide a portal (specific to a given slave server 3 and therefore country customized) listing the available multimedia contents to the user terminal 1.

In the case of a mobile terminal, the dedicated client application advantageously automatically requests the lower quality version of said target multimedia content.

Consequently, everything is totally transparent to the user, which has nothing to choose and does not even know that he is communicating with a slave server 3 instead of the master server 2.

In the case of video, this client application may be dedicated to VOD services only, or also used for accessing TV IP programs through the same server, thereby offering a single mobile interface for accessing both TV and VOD. This implementation is easy to implement since, in television, a continuous streaming is used while lower quality content may be continuously downloaded from a dedicated server (for instance preferably also the master server 2—in other words, when the user selects a VOD content, a request is sent to the slave server 3, while when the user selects a TV content, a request is sent to the master server 2). Thus, adaptation for also dealing with the delivery of VOD is straight forward, while also providing the best user experience.

Slave Server and Computer Program

In a second aspect, the present development concerns a slave server 3, adapted for carrying out the method for providing to a user terminal 1 a target multimedia content belonging to a first set of multimedia contents available at a master server 2 as previously described.

As already explained, the user terminal 1 is preferably a mobile terminal such as a smartphone or a touch tablet. The slave server 3 is connected to both the user terminal 1 and the master server 2 through a network 10, and typically comprises a processing unit 31 and a storage unit 32.

Said processing unit 11 is configured to implement:

Synchronizing the slave server 3 with the master server 2 so that each multimedia content of said first set of multimedia contents available at a master server 2 is also available at the slave server 3;

Providing said target multimedia content to the user terminal 1 from the slave server 3.

The development further proposes a computer program product, comprising code instructions for executing (in particular with a processing unit 31 of the slave server 3) a method according to the first aspect of the development for providing to a user terminal 1 a target multimedia content belonging to a first set of multimedia contents available at a master server 2; and a computer-readable medium (in particular a memory 32 of the slave server 3), on which is stored a computer program product comprising code instructions for executing said method.

The invention claimed is:

1. A method for providing to a user terminal a target multimedia content belonging to a first set of multimedia contents available at a master server, the master server being a content server of a Content Delivery Network, wherein the method comprises, performed by a processing unit of a slave server connected to both the user terminal and the master server through a network:
   synchronizing the slave server with the master server so that each multimedia content of the first set of multimedia contents available at the master server is also available at the slave server; and
   providing the target multimedia content to the user terminal from the slave server,
   wherein the first set of multimedia contents are available at the master server under at least a higher quality version and a lower quality version, and the first set of multimedia contents are available at the slave server only under the lower quality version,
   and wherein the user terminal is implementing a dedicated client application for redirecting a user to the slave server and automatically requesting the lower quality version to the slave server, in case the user terminal is a mobile terminal.

2. The method according to claim 1, wherein providing the target multimedia content to the user terminal from the slave server is performed when receiving a request for the target multimedia content from the user terminal.

3. The method according to claim 1, wherein synchronizing the slave server with the master server is periodically performed, in particular at least once every hour.

4. The method according to claim 1, wherein the master server stores a first indexation file describing the first set of multimedia contents available at the master server; and the slave server stores a second indexation file describing a second set of multimedia contents available at the slave server.

5. The method according to claim 4, wherein synchronizing the slave server with the master server comprises downloading the first indexation file from the master server and updating the second indexation file.

6. The method according to claim 1, wherein synchronizing the slave server with the master server comprises:

checking if at least one new multimedia content has been added to the first set of multimedia contents available at the master server; and
   downloading from the master server each new multimedia content added to the first set of multimedia contents available at the master server, in order to add the new multimedia content to a second set of multimedia contents available at the slave server.

7. The method according to claim 6, wherein synchronizing the slave server with the master server comprises:
   checking if at least one multimedia content has been deleted from the first set of multimedia contents available at the master server; and
   deleting each multimedia content deleted from the first set of multimedia contents available at the master server from the second set of multimedia contents available at the slave server.

8. The method according to claim 7, wherein the master server is configured to generate, for each higher quality version of a multimedia content available at the master server, a corresponding lower quality version.

9. A system comprising a user terminal and a slave server connected to both the user terminal and a master server through a network, a first set of multimedia contents including a target multimedia content being available at the master server, the master server being a content server of a Content Delivery Network, wherein the slave server comprises a processing unit configured to implement:
   synchronizing the slave server with the master server so that each multimedia content of the first set of multimedia contents available at a master server is also available at the slave server; and
   providing the target multimedia content to the user terminal from the slave server,
   wherein the first set of multimedia contents are available at the master server under at least a higher quality version and a lower quality version, and the first set of multimedia contents are available at the slave server only under the lower quality version,
   and wherein the user terminal is implementing a dedicated client application for redirecting a user to the slave server and automatically requesting the lower quality version to the slave server, in case the user terminal is a mobile terminal.

10. A processing circuit comprising a processor and a memory, the memory storing program code instructions of a computer program for executing a method for providing to a user terminal a target multimedia content belonging to a first set of multimedia contents available at a master server, the master server being a content server of a Content Delivery Network, wherein the method comprises, performed by a processing unit of a slave server connected to both the user terminal and the master server through a network:
   synchronizing the slave server with the master server so that each multimedia content of the first set of multimedia contents available at the master server is also available at the slave server; and
   providing the target multimedia content to the user terminal from the slave server,
   wherein the first set of multimedia contents are available at the master server under at least a higher quality version and a lower quality version, and the first set of multimedia contents are available at the slave server only under the lower quality version,
   and wherein the user terminal is implementing a dedicated client application for redirecting a user to the slave server and automatically requesting the lower quality version to the slave server, in case the user terminal is a mobile terminal.

11. A non-transitory computer-readable medium, storing code instructions of a computer program for executing a method for providing to a user terminal a target multimedia content belonging to a first set of multimedia contents available at a master server, the master server being a content server of a Content Delivery Network, wherein the method comprises, performed by a processing unit of a slave server connected to both the user terminal and the master server through a network:

synchronizing the slave server with the master server so that each multimedia content of the first set of multimedia contents available at the master server is also available at the slave server; and providing the target multimedia content to the user terminal from the slave server, wherein the first set of multimedia contents are available at the master server under at least a higher quality version and a lower quality version, and the first set of multimedia contents are available at the slave server only under the lower quality version, and wherein the user terminal is implementing a dedicated client application for redirecting a user to the slave server and automatically requesting the lower quality version to the slave server, in case the user terminal is a mobile terminal.

\* \* \* \* \*